No. 751,859. PATENTED FEB. 9, 1904.
G. W. LA VOO.
METHOD OF SCREW THREADING AND WELDING THREAD PROTECTORS, &c.
APPLICATION FILED SEPT. 24, 1902.
NO MODEL.
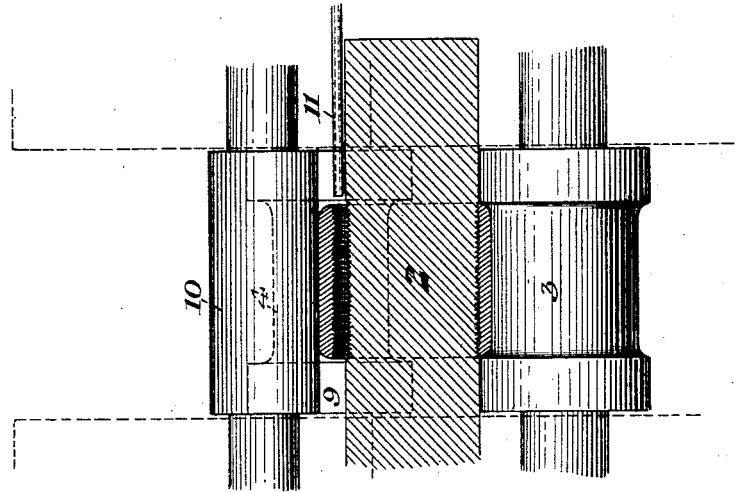
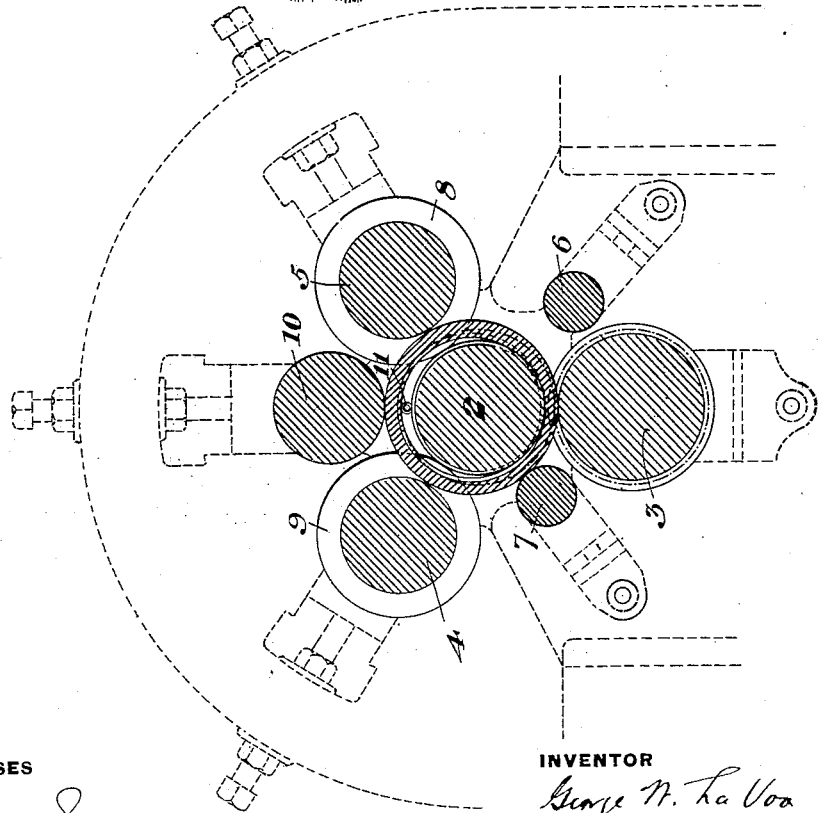
WITNESSES
INVENTOR No. 751,859. Patented February 9, 1904.

UNITED STATES PATENT OFFICE.

GEORGE W. LA VOO, OF STEUBENVILLE, OHIO.

METHOD OF SCREW-THREADING AND WELDING THREAD-PROTECTORS, &c.

SPECIFICATION forming part of Letters Patent No. 751,859, dated February 9, 1904.

Application filed September 24, 1902. Serial No. 124,613. (No model.)

*To all whom it may concern:*

Be it known that I, GEORGE W. LA VOO, of Steubenville, Jefferson county, Ohio, have invented a new and useful Method of Screw-Threading and Welding Thread-Protectors, &c., of which the following is a full, clear, and exact description, reference being had to the accompanying drawings, forming part of this specification, in which—

Figure 1 is a vertical cross-section of the rolls forming the mill, and Fig. 2 is a front elevation, partly broken away.

My invention relates to the making of ring-shaped articles such as pipe-couplings, thread-protectors, &c., having either a part or the whole of their inner surface provided with screw-threads, and is designed to provide an improved method of producing such articles. Heretofore such articles have been formed in practice by first welding a coupling or ring having a plain inner surface, and thereafter forming the screw-threads by tapping.

My invention greatly reduces the cost of producing such articles and increases the output; and it consists of a cluster-roll mill having a mandrel provided in at least a portion thereof with external screw-threads.

In the drawings, in which I show one form of mill arranged in accordance with my invention, 2 is a central mandrel having an externally-threaded portion 2' beyond which the ends of the mandrel are plain and of a diameter equal to that of the threaded portion, though this may or may not be so, depending upon the way the article is formed upon the mandrel. This mandrel is held centrally between rolls 3, 4, and 5, of which 3 is the pressing and welding roll, having a pass suitably shaped to force the metal of the blank against the mandrel and into its screw-threads, as shown in Fig. 2.

6 is an entering guide-roller in front of the roll 3, and 7 is a rotary guide-roller in the rear of and above the roller 3, which prevents the entering end of the blank from dropping down and forces it in contact with the mandrel.

I have shown the rollers 4 and 5 as being mandrel-holding rollers, they having collars 8 and 9, which contact with the mandrel in its unthreaded portion. The body of these rolls is preferably cut back, so that the coupling is out of contact with them. They may, however, be made in the form of guide-rollers, as in the ordinary cluster mill, and arranged to force the metal upon the mandrel.

10 is a sizing-roll which is shown as mounted above and between the rolls 4 and 5, this roll being adjustable, so that the size of the coupling may be changed by adjusting it toward and from the mandrel. The bearings for the rollers 3 and 10 are preferably adjustable, and the other rolls may be adjusted or not, as desired.

In using the mill the heated blank is fed in over the roller 6 and is forced by the roll 3 into the screw-threads of the mandrel. The mandrel is rotated, and as the blank is fed on it is forced around the mandrel which rotates with it and is thus shaped into a coupling, the registering ends welded together, and its inner surface provided with screw-threads, all at the same operation. The mandrel is then slipped out endwise from the coupling, which has a larger inner diameter than it, and the mandrel is replaced and the next blank fed in. If the cluster-rolls are arranged to cause the metal to tightly hug the mandrel so that the coupling fits tightly upon it the mandrel may be screwed out from the welded article by making the end portions of a diameter equal to or less than that between the roots of the threads.

The rolls may be water-cooled to keep them at the desired temperature, and a stream of water may be fed between the mandrel and the article that is being threaded by a pipe 11 to wash out any scale or other loose particle that might prevent a sharp impression being given to the article.

The advantages of my invention are obvious, since the threaded article is formed at a single operation and without the necessity for further tapping.

The apparatus may be widely varied without departing from my invention, since I consider myself the first to shape, weld, and screw-thread a ring at a single operation.

I claim—

The method of forming internally-threaded rings, consisting in rolling a heated blank into ring form around an externally-threaded mandrel and forming a ring of larger diameter than said mandrel; substantially as described.

In testimony whereof I have hereunto set my hand.

GEORGE W. LA VOO.

Witnesses:
J. E. WRIGHT,
JOHN BAXTER.